(12) United States Patent
Kuki

(10) Patent No.: US 6,506,066 B2
(45) Date of Patent: Jan. 14, 2003

(54) ROTATION CONNECTION UNIT

(75) Inventor: Heiji Kuki, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/904,844

(22) Filed: Jul. 16, 2001

(65) Prior Publication Data
US 2002/0019150 A1 Feb. 14, 2002

(30) Foreign Application Priority Data
Jul. 17, 2000 (JP) ......................................... 2000-216344

(51) Int. Cl.[7] .............................................. H01R 35/04
(52) U.S. Cl. ...................................................... 439/164
(58) Field of Search .................................. 439/164, 15

(56) References Cited

U.S. PATENT DOCUMENTS

| | | | | |
|---|---|---|---|---|
| 5,865,634 A | * | 2/1999 | Best ............................. | 439/164 |
| 5,882,216 A | | 3/1999 | Matsumoto et al. ......... | 439/164 |
| 5,890,921 A | * | 4/1999 | Kuroda et al. ............... | 439/164 |
| 6,012,935 A | * | 1/2000 | Bolen et al. ................. | 439/164 |

* cited by examiner

Primary Examiner—Gary Pauman
(74) Attorney, Agent, or Firm—Oliff & Berridge, PLC

(57) ABSTRACT

First and second cables 4 and 5 are housed in a cable housing space 3 formed between a case 1 and a rotor 2 in a state in which a force in a direction touching the inner periphery of the case 1 is given.

10 Claims, 8 Drawing Sheets

ROTATION CONNECTION UNIT

BACKGROUND OF THE INVENTION

1. Technical Field

This invention relates to a rotation connection unit, for example, being built in a steering system of an automobile for use as means for connecting circuit wiring of a steering wheel side (rotation side) and a body side (fixed side).

2. Related Arts

Hitherto, as this kind of rotation connection unit, a swirl type wherein a belt-like cable for conduction, which normally is called a flat cable and will be hereinafter called simply cable, is wound like a swirl in a cable housing space and an inversion type wherein the winding direction of the cable is inverted at an intermediate point have been known.

An inversion-type rotation connection unit taking an inversion-type multiple-winding structure of housing two or more cables in response to an increase in the number of circuits to be connected is also known.

FIG. 8 is a sectional view of a rotation connection unit in a related art and FIG. 9 is a front view of only cables in the rotation connection unit in the related art. Here, a double-winding structure using two flat cables is taken as an example and the case where the rotation connection unit is built in a steering system of an automobile is illustrated.

In the figures, numeral 101 denotes a case as a cylindrical outer member fixed to the body side of the automobile and numeral 102 denotes a rotor as an inner member rotated in one piece with a steering shaft. A cable housing space 103 is formed between the case 101 and the rotor 102. Two cables (a first cable and a second cable) 104 and 105 are housed in the cable housing space 103 in such a manner that they are wound and that the cable winding direction is inverted at an intermediate point.

A guide ring 106 for movably guiding both the cables 104 and 105 has guide grooves 107 and 108 at two parts in a circumferential direction (usually, symmetrical two parts spaced 180 degrees from each other as shown in the figure). An inversion part 104a of the first cable 104 is passed through one guide groove 107 (first guide groove) and an inversion part 105a of the second cable 105 is passed through the other guide groove 108 (second guide groove).

Both the cables 104 and 105 have inner peripheral terminals fixed to the rotor 102 by inner peripheral terminal members 109 and 110 and outer peripheral terminals fixed to the case 101 by outer peripheral terminal members 111 and 112.

The inner peripheral terminal members 109 and 110 and the outer peripheral terminal members 111 and 112 are placed at the same position or different positions with respect to both the cables 104 and 105. In the example shown in the figure, the inner peripheral terminal members 109 and 110 are placed at almost symmetrical positions with respect to the rotation center and the outer peripheral terminal members 111 and 112 are placed at the same position.

The inner peripheral terminal members 109 and 110 are housed separately in inner peripheral terminal spaces 113 and 114 provided swelling inwardly at two parts of the inner periphery of the rotor 102 and the outer peripheral terminal members 111 and 112 are housed together in an outer peripheral terminal space 115 provided swelling outwardly at one part of the outer periphery of the case 101. Outer wiring of the steering wheel side and outer winding of the body side are connected to the terminal members 109, 110, 111, and 112.

Problem to be Solved

However, in the rotation connection unit having the inversion-type double-winding structure, the following problems occur:

(1) When the steering wheel is turned at high speed, a discrepancy occurs between the rotation speed of the guide ring 106 and the move speed of cable's inner and outer peripheral portions 104b, 104c, 105b, and 105c and a situation in which coming and going of the cable inversion part 104a, 105a relative to the guide groove 107, 108 is too late occurs.

In this case, a phenomenon in which the cable's outer peripheral portions 104c and 105c stick to the guide ring 106 so as to fasten the guide ring 106 from the outer periphery occurs and accordingly it is feared that rotation resistance of the guide ring 106 may grow.

(2) Both the cables 104 and 105 differ in fixing positions of inner and outer peripheral terminals and thus are set to difference lengths. If the lengths vary because of manufacturing tolerances, a situation in which the length difference to be provided between both the cables shifts from the setup value occurs.

If such a situation occurs, the relative positions of the inversion parts 104a and 105a of both the cables 104 and 105 shift and thus either of them is hard to be well housed in the guide groove 107, 108 at the assembling time.

In this case, in the rotation connection unit in the related art having no flexibility of the cable length, there is little room for absorbing the cable length discrepancy from the setup value and thus it becomes difficult or impossible to assemble or as a result of forcibly passing the cable inversion parts 104a and 105a through the guide grooves 107 and 108, it is feared that smooth motion of the guide ring 106 may be hindered.

SUMMARY OF THE INVENTION

It is an object of the invention to provide a rotation connection unit for making it possible to provide the length of a cable outer peripheral portion with flexibility.

Means for Solving the Problem

According to the invention as in aspect 1, there is provided a rotation connection unit wherein an inner member and an outer member are fitted for relative rotation in a state in which a cable housing space is formed between the inner member and the outer member, wherein a plurality of conduction cables are housed in the cable housing space in a state in which the winding direction is inverted at an intermediate point and the cables move with relative rotation of both the members, and wherein a guide ring for guiding moving of the cables is placed rotatably and is formed with a plurality of guide grooves through which inversion parts of the cables are passed at different positions, characterized in that the cables are housed in the cable housing space in a state in which a force in a direction touching the inner periphery of the outer member is given.

According to the configuration, the cable is housed in the cable housing space in a state in which the force in the direction touching the inner periphery of the outer member is given, so that the cable outer peripheral portion can be changed with a constant margin. The length of the cable outer peripheral portion is thus provided with flexibility, whereby if the rotation connection unit is rotated at high speed, a phenomenon in which the cable outer peripheral portion sticks to the guide ring so as to fasten the guide ring 6 from the outer periphery does not occur, so that an increase in the rotation resistance of the guide ring can be prevented. Shift from the setup value caused by cable length manufacturing tolerances can be absorbed, assembling the rotation connection unit is facilitated, or smooth motion of the guide ring can be provided.

For example, as in aspect 2, the cable maybe formed longer than the length of the outer peripheral portion of the cable touching the outer periphery of the guide ring, whereby the force in the direction touching an inner periphery of the outer member is given.

Further, as in aspect 3, if the rotation connection unit comprises terminal position adjustment means for attaching a terminal member attached to a terminal of the cable to the outer member or the inner member so that the position of the terminal member can be adjusted in a length direction of the cable, the cable outer peripheral portion can be changed with a constant margin by adjusting the position of the terminal member.

For example, as in aspect 4, the terminal position adjustment means may comprise a plurality of engaged parts formed in the outer member or the inner member at predetermined pitches in the length direction of the cable and an engagement part which is formed on the terminal member and can engage at least one of the engaged parts.

Further, as in aspect 5, if the terminal member attached to the terminal of the cable is attached to the outer member or the inner member in a state in which it can be moved in the length direction of the cable and is elastically urged in a direction in which the cable touches the outer member, the cable outer peripheral portion can be changed with a constant margin as the terminal member is moved.

Further, as in aspect 6, if the cables are formed like springs in the terminal proximity portions, the cable outer peripheral portion can be changed with a constant margin as the cable itself becomes deformed.

DETAILED DESCRIPTION OF THE PREFERRED EMBODIMENTS

Mode for Carrying Out the Invention
(First Embodiment)

Figure 1:
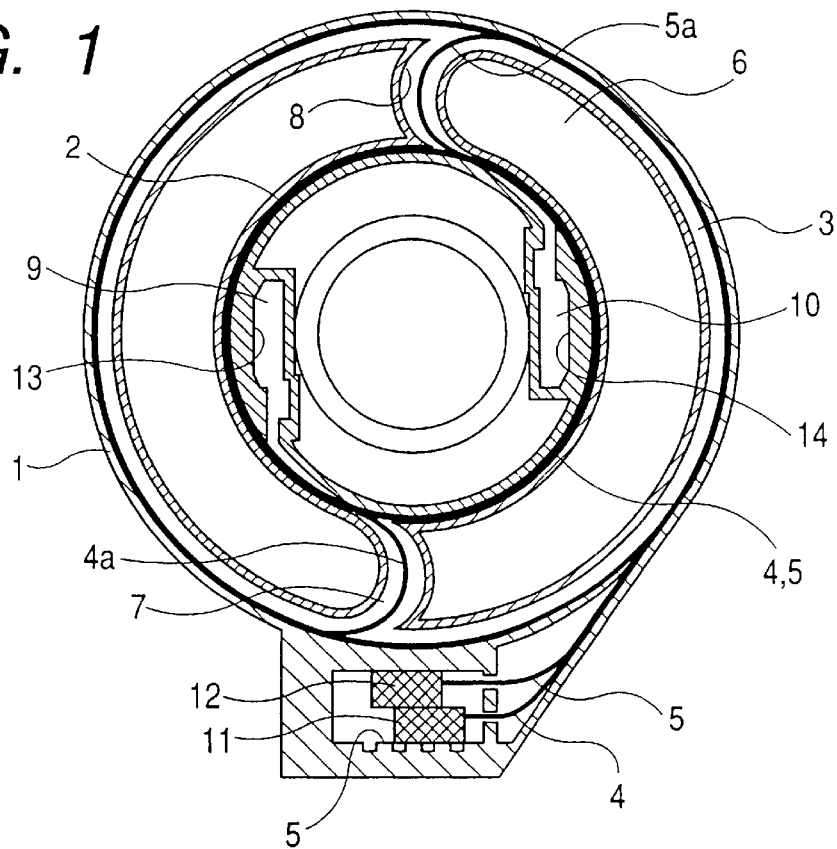
FIGS. 1 and 1A are sectional views of a rotation connection unit according to a first embodiment of the invention.
Figure 1A:
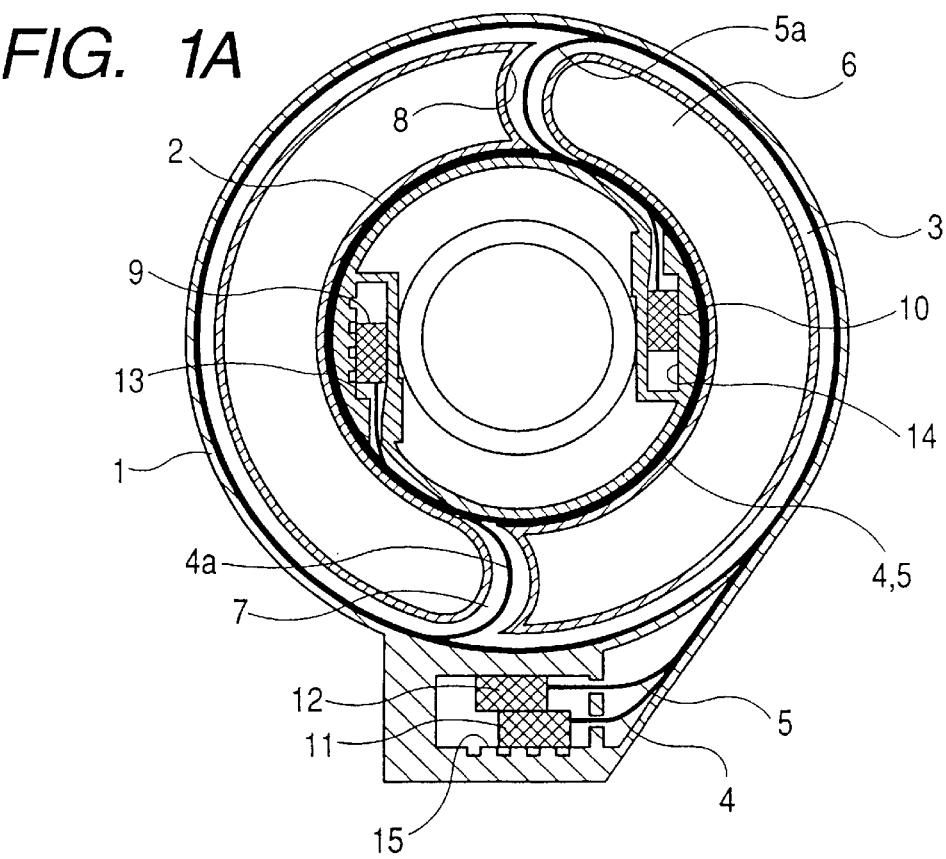
Figure 2:
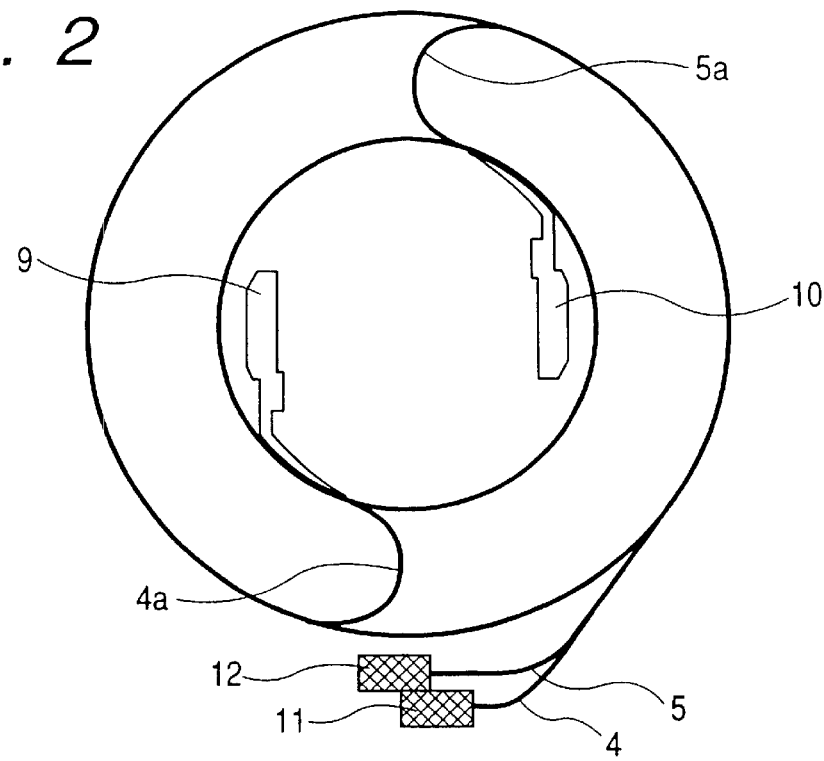
FIGS. 2 and 2A are front views to show only cables in the rotation connection unit.
Figure 2A:
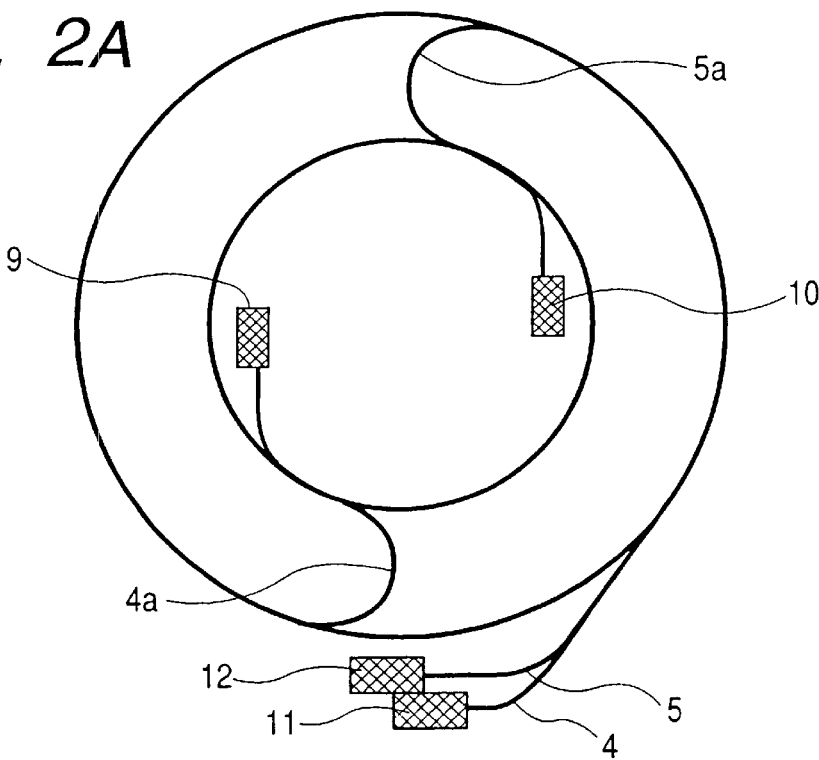

FIG. 1 is a sectional view of a rotation connection unit of a first embodiment of the invention and FIG. 2 is a front view to show only cables in the rotation connection unit. Here, a rotation connection unit taking an inversion-type double-winding structure is taken as an example incorporating the invention.

In FIGS. 1, 1A, 2 and 2A, numeral 1 denotes a case as an outer member, numeral 2 denotes a rotor as an inner member, numeral 3 denotes a cable housing space formed therebetween, numerals 4 and 5 denote first and second cables housed in the cable housing space 3 in an inversion double-winding state, and numerals 4a and 5a denote inversion parts of both the cables 4 and 5. Both the cable inversion parts 4a and 5a are passed separately through first and second guide grooves 7 and 8 of a guide ring 6.

Inner peripheral terminal members 9 and 10 are attached to inner peripheral terminals of both the cables 4 and 5 and outer peripheral terminal members 11 and 12 are attached to outer peripheral terminals.

The inner peripheral terminal members 9 and 10 are housed separately in inner peripheral terminal spaces 13 and 14 provided projecting inwardly at two parts of the inner periphery of the rotor 2 and the outer peripheral terminal members 11 and 12, which will be hereinafter referred to as first and second outer peripheral terminal members, are housed in an outer peripheral terminal space 15 provided projecting outwardly at one part of the outer periphery of the case 1.

Figure 3:
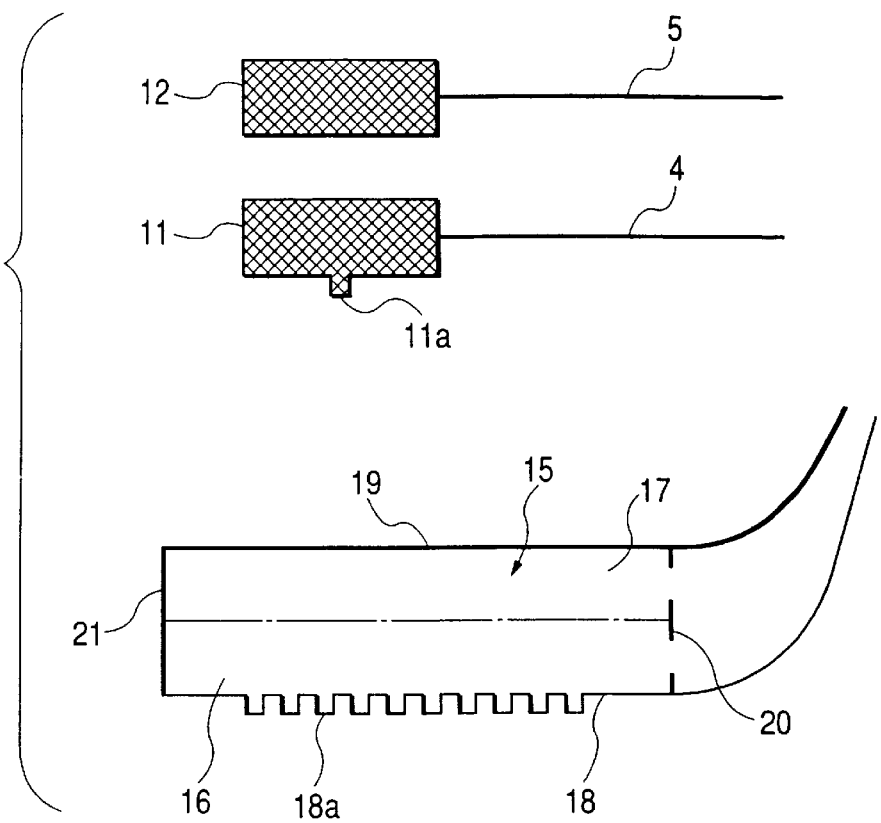
FIG. 3 is a schematic representation to schematically show the main part.
Figure 4:
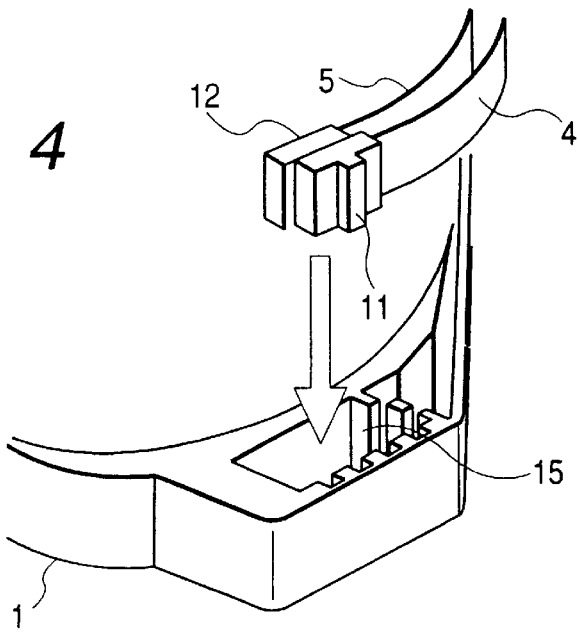
FIG. 4 is a perspective view of the main part on an enlarged scale.
Figure 5A:
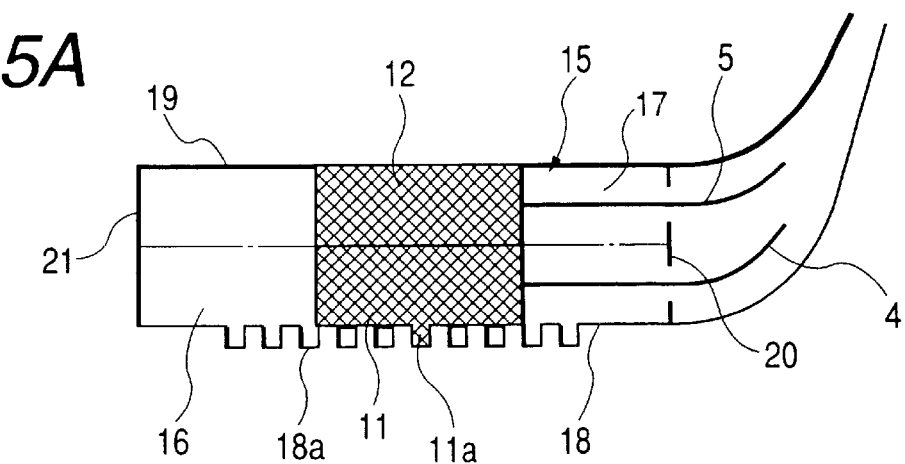
FIGS. 5A to 5D are schematic representations of the operation in the rotation connection unit.
Figure 5B:
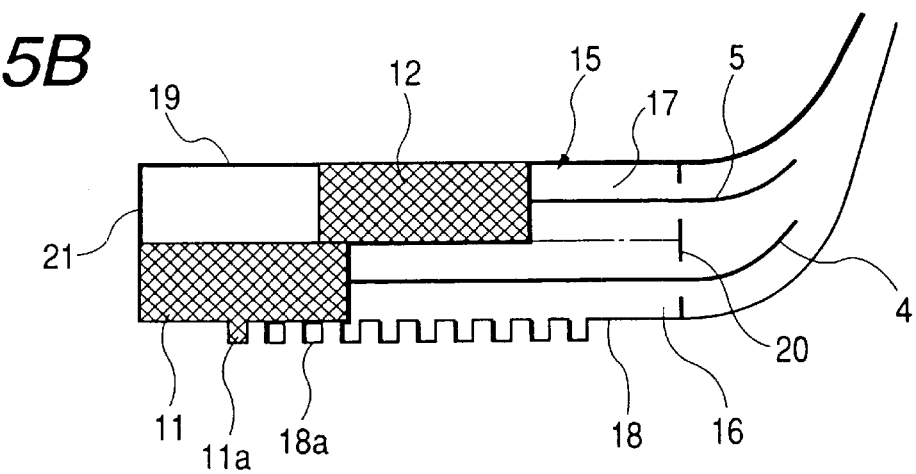
Figure 5C:
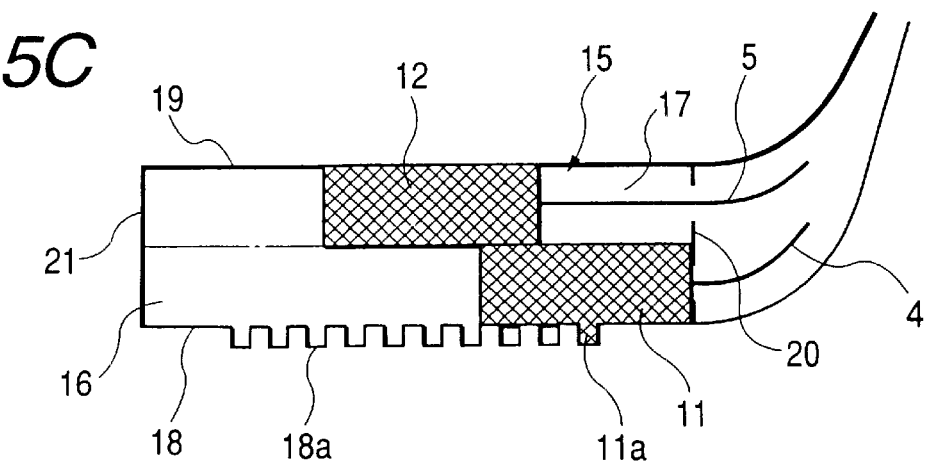

In the first embodiment, both the cables 4 and 5 are housed in the cable housing space 3 in a state in which a force in a direction touching the inner periphery of the case 1 is given. Thus, the main part is configured as follows:

FIG. 3 is a schematic representation to schematically show the main part, FIG. 4 is a perspective view of the main part on an enlarged scale, and FIGS. 5A to 5C are schematic representations of the operation in the rotation connection unit.

Here, the outer peripheral terminal space 15 consists of a first outer peripheral housing section 16 for housing the first outer peripheral terminal member 11 and a second outer peripheral housing section 17 for housing the second outer peripheral terminal member 12. The first and second outer peripheral terminal members 11 and 12 are housed in the first and second outer peripheral housing sections 16 and 17 in a state in which the cable connection port heads for the cable exit. Both the housing sections are surrounded by wall faces 18 to 21 with parts shared therebetween; however, further an intermediate wall for partitioning both the housing sections may be provided.

A plurality of concave parts (engaged parts of terminal position adjustment means) 18a shaped like angular grooves in the depth direction of the figure are formed from side to side at predetermined pitches in an outer peripheral wall 18 of the first housing section 16. At the center of the first outer peripheral terminal member 11 in the length direction thereof, a convex part (engagement part of terminal position adjustment means) 11a of a shape that can engage one of the concave parts 18a is formed facing the concave parts 18a. The numbers and shapes of the concave and convex parts 18a and 11a are not limited to those illustrated in the figures.

On the other hand, an inner peripheral wall 19 of the second outer peripheral housing section 17 is not formed with any concave parts as described above and the second outer peripheral terminal member 12 is not formed with a convex part as described above, but the second outer peripheral terminal member 12 is fixed to a proper part of the second outer peripheral housing section 17 by a proper method (for example, screwed, etc., to the inner peripheral wall 19). The second outer peripheral terminal member 12 and the second outer peripheral housing section 17 may be engaged by the same method as the engagement method of the first outer peripheral terminal member 11 and the first outer peripheral housing section 16.

A front trap wall 20 having notches for allowing cables to be inserted is formed at cable 4 and 5 entrances of the first and second outer peripheral housing sections 16 and 17 for preventing the first and second outer peripheral terminal members 11 and 12 from being drawn out forward from the first and second outer peripheral housing sections 16 and 17.

A rear trap wall 21 is formed on an opposite side to the front trap wall 20 of the first and second outer peripheral housing sections 16 and 17 for preventing the first and second outer peripheral terminal members 11 and 12 from being drawn out backward from the first and second outer peripheral housing sections 16 and 17.

Specifically, as shown in FIG. 5A, if the first cable 4 is the target value, the second outer peripheral terminal member 12 is previously fixed to the center in the length direction in the second outer peripheral housing section 17, and the first outer peripheral terminal member 11 has the convex part 11a fitted into the concave part 18a at the center of the first outer peripheral housing section 16 in the length direction thereof for setting the position. Consequently, the first and second outer peripheral terminal members 11 and 12 are overlaid up and down in the figure in the first and second outer peripheral housing sections 16 and 17.

On one hand, as shown in FIG. 5B, if the first cable 4 is too long, the second outer peripheral terminal member 12 is previously fixed to the center in the length direction in the second outer peripheral housing section 17, and the first outer peripheral terminal member 11 has the convex part 11a fitted into the concave part 18a to the left from the center of the first outer peripheral housing section 16 in the length direction thereof for setting the position. In this case, the range in which the first outer peripheral terminal member 11 can be set is regulated by means of the rear trap wall 21 of the first outer peripheral housing section 16. Consequently, the first and second outer peripheral terminal members 11 and 12 are placed off each other up and down in the first and second outer peripheral housing sections 16 and 17.

On the other hand, as shown in FIG. 5C, if the first cable 4 is too short, the second outer peripheral terminal member 12 is previously fixed to the center in the length direction in the second outer peripheral housing section 17, and the first outer peripheral terminal member 11 has the convex part 11a fitted into the concave part 18a to the right from the center of the first outer peripheral housing section 16 in the length direction thereof for setting the position. In this case, the range in which the first outer peripheral terminal member 11 can be set is regulated by means of the front trap wall 20 of the first outer peripheral housing section 16. Consequently, the first and second outer peripheral terminal members 11 and 12 are placed off each other up and down in the first and second outer peripheral housing sections 16 and 17.

According to the configuration, the first and second cables 4 and 5 are housed in the cable housing space 3 in a state in which a force in the direction touching the inner periphery of the case 1 is given, so that the cable outer peripheral portion can be changed with a constant margin. The length of the cable outer peripheral portion is thus provided with flexibility, whereby if the rotation connection unit is rotated at high speed, a phenomenon in which the cable outer peripheral portion sticks to the guide ring 6 so as to fasten the guide ring 6 from the outer periphery does not occur, so that an increase in the rotation resistance of the guide ring 6 can be prevented. It is made possible to absorb the above-mentioned cable manufacturing tolerances and easily route the cables 4 and 5 on a predetermined route where the inversion parts 4a and 5a are properly fitted into the guide grooves 7 and 8.

Figure 5D:
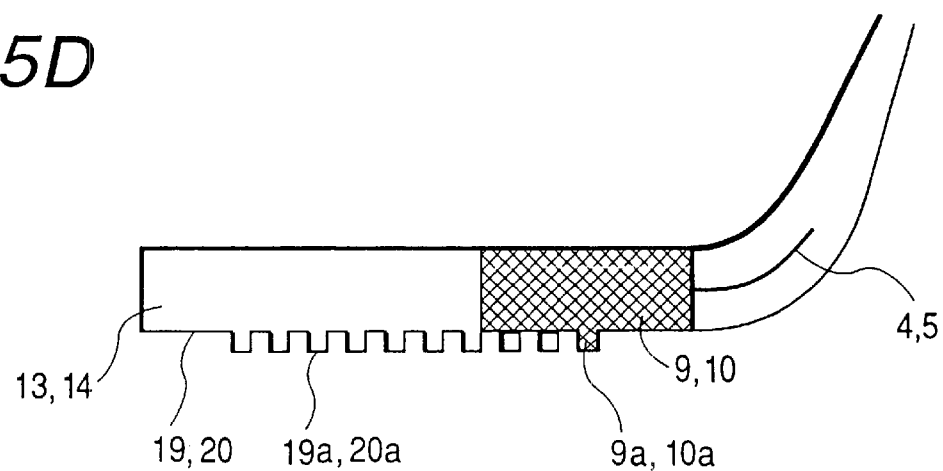

FIG. 5D shows cables 4 and 5 connected to inner peripheral terminal members 9 and 10 in terminal spaces 13 and 14. The inner peripheral terminal members 9 and 10 are secured by convex parts 9a and 10a to an inner peripheral wall 19 and 20 at a plurality of concave parts 19a and 20a shaped as angular grooves. Therefore, the rotation connection unit can be easily assembled and smooth rotation of the guide ring 6 can be provided.

In the description made above, the outer peripheral surface 18 is formed with a plurality of concave parts 18a and the first outer peripheral terminal member 11 is formed with the convex part 11a; however, the outer peripheral surface 18 may be formed with a plurality of convex parts and the first outer peripheral terminal member 11 may be formed with the concave part.

(Second Embodiment)

Figure 6:
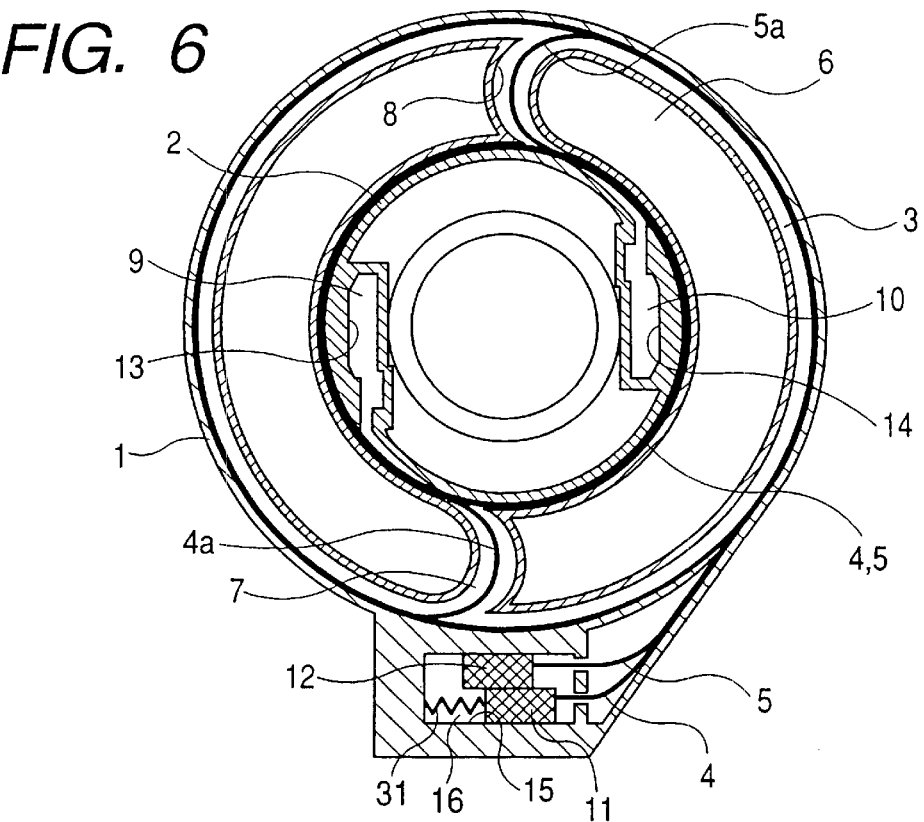
FIGS. 6 and 6A are sectional views of a rotation connection unit according to a second embodiment of the invention.
Figure 6A:
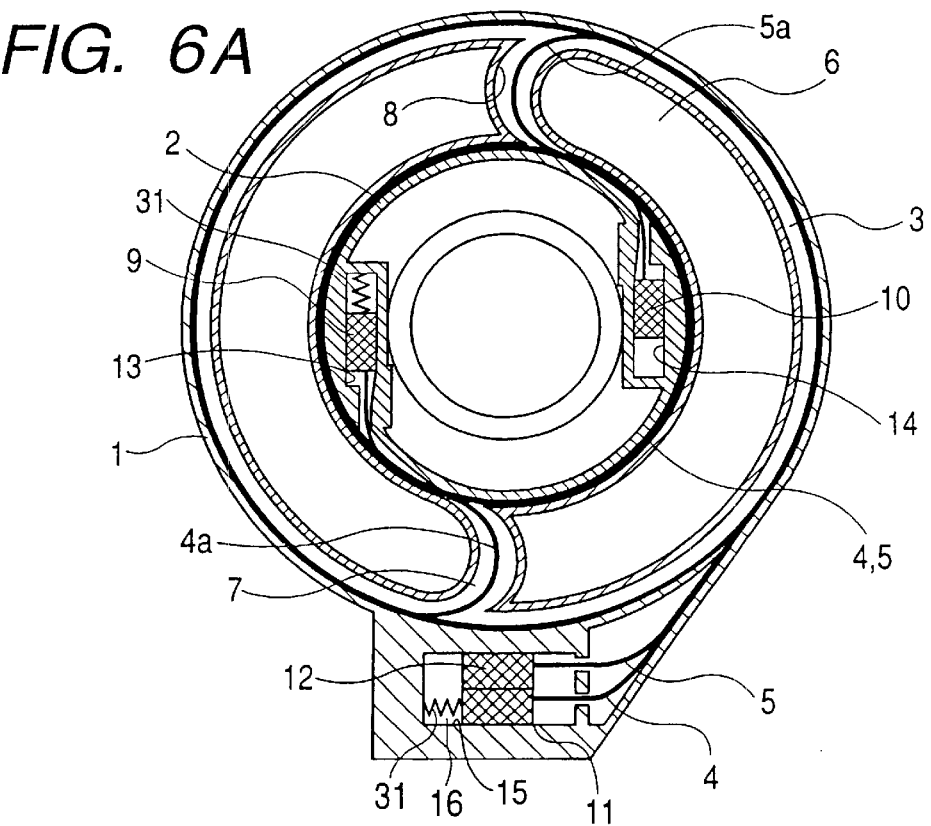

FIGS. 6 and 6A are sectional view of a rotation connection unit of a second embodiment of the invention. Parts identical with or similar to those previously described with reference to FIGS. 1 and 1A in the first embodiment are denoted by the same reference numerals in FIGS. 6 and 6A and will not be discussed again.

Here, first and second outer peripheral terminal members 11 and 12 are attached to outer peripheral terminals of first and second cables 4 and 5 and the first outer peripheral terminal member 11 can be moved in the length direction of the first cable 4. To move the first outer peripheral terminal member 11, for example, a guide groove (not shown) may be formed in a first outer peripheral housing section 16 and a projection part (not shown) that can be movably fitted into the guide groove may be formed on the first outer peripheral terminal member 11.

The first outer peripheral terminal member 11 is attached to the inside of the first outer peripheral housing section 16 in a state in which it is elastically urged by a spring 31 in a direction in which the first cable 4 touches the inner periphery of a case 1.

A spring having an elastic modulus capable of sticking the first cable 4 to the case 1 is adopted as the spring 31. Any other elastic member such as rubber may be used in place of the spring 31.

According to the configuration, as the first outer peripheral terminal member 11 is moved, the cable outer peripheral portion can be changed with a constant margin. Therefore, an advantage similar to that of the first embodiment can be provided. The configuration of the second cable 5 side may be made similar to that of the first cable 4 side.

(Third Embodiment)

Figure 7:
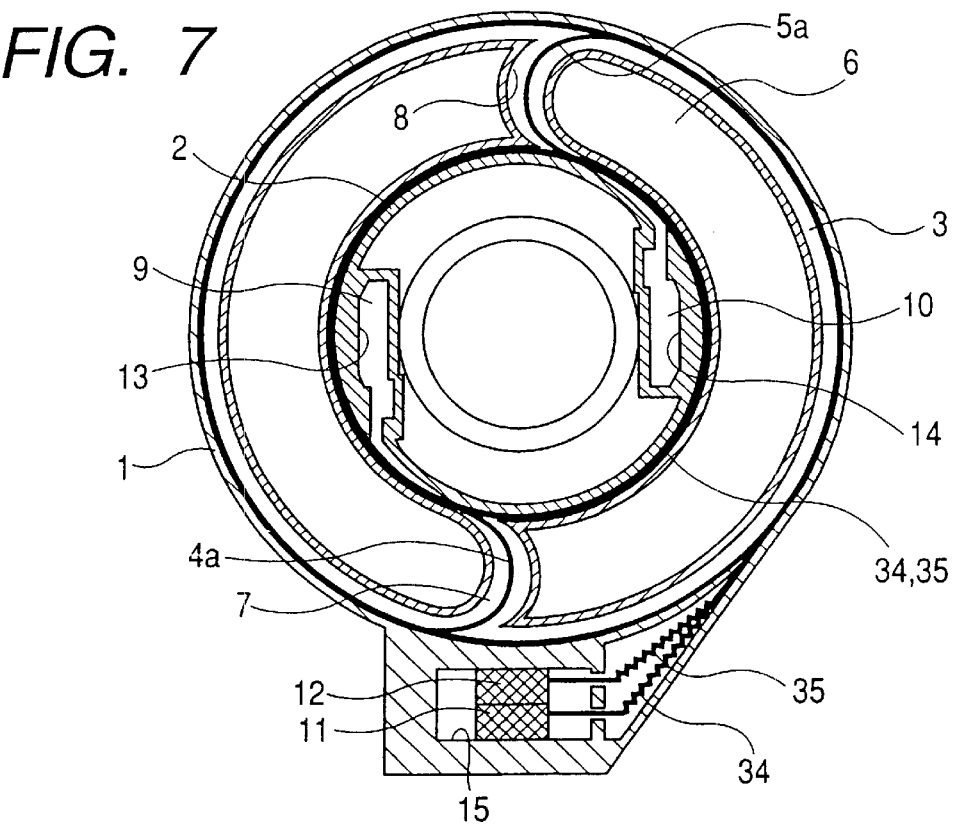
FIGS. 7 and 7A are sectional views of a rotation connection unit according to a third embodiment of the invention.
Figure 7A:
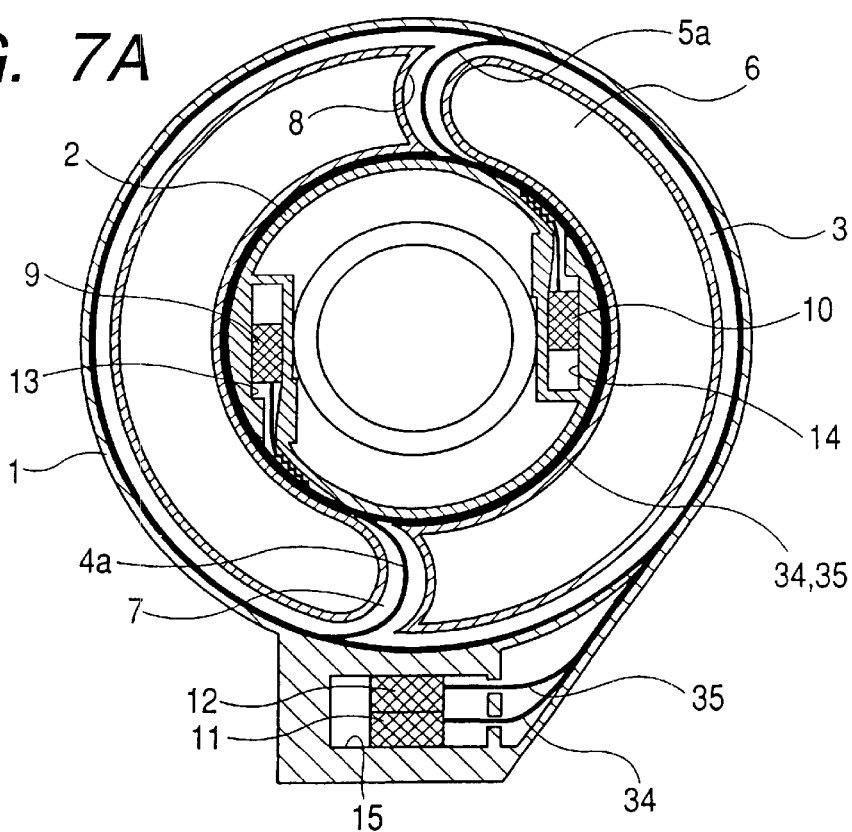
Figure 8:
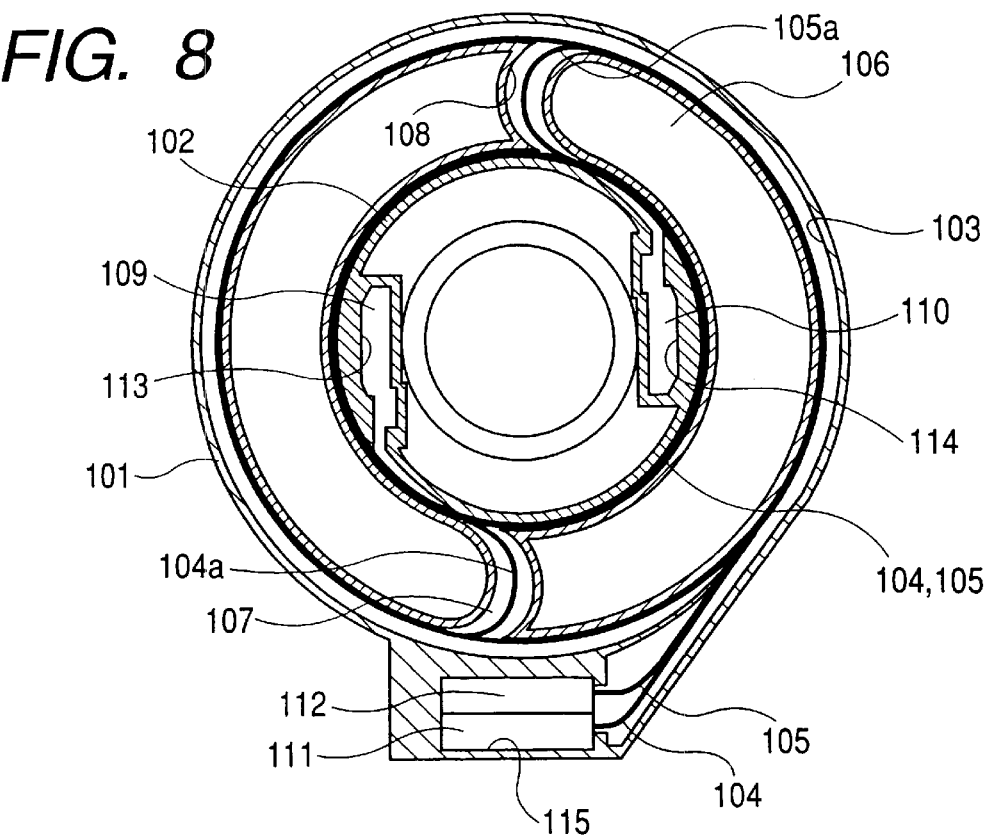
FIG. 8 is a sectional view of a rotation connection unit in a related art.
Figure 9:
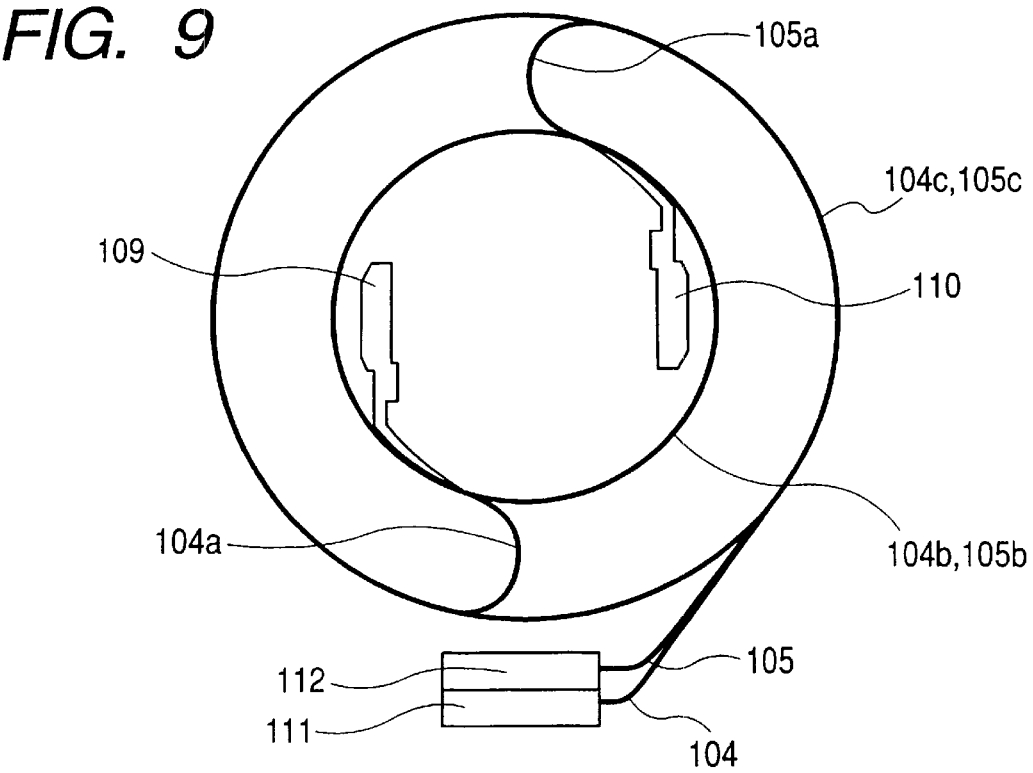
FIG. 9 is a front view of only cables in the rotation connection unit in the related art.

FIGS. 7 and 7A are sectional views of a rotation connection unit of a third embodiment of the invention. Parts identical with or similar to those previously described with reference to FIGS. 1, 1A, 6 and 6A in the first and second embodiments are denoted by the same reference numerals in FIGS. 7 and 7A and will not be discussed again.

Here, first and second cables 34 and 35 are formed like springs in terminal proximity portions. For example, the connection part proximities of both the cables 34 and 35 to first and second outer peripheral terminal members 11 and 12 may be formed like waves different in pitches. The purpose of making the wave pitches different between both the cables 34 and 35 is to prevent the expansion/contraction operation of one cable 34, 35 from interfering with that of the other cable 35, 34.

Alternatively, a thin plate made of stainless steel, etc., (not shown) may be sandwiched between both the cables 34 and 35 to eliminate the interference between both the cables or may be bonded to both the cables, thereby providing the cables themselves with elasticity.

According to the configuration, the cable outer peripheral portion can be changed with a constant margin by the spring force of the first, second cable 34, 35 itself. Therefore, an advantage similar to that of the first embodiment, the second embodiment can be provided.

In the first to third embodiments, the configurations of the first and second outer peripheral terminal members 11 and 12 have been described; however, similar configuration may be adopted for the inner peripheral terminal members 9 and 10, as illustrated in FIGS. 1A, 2A, 6A and 7A. In this case, an advantage similar to that described above can also be provided.

In each of the first to third embodiments, the inversion-type double-winding structure using two flat cables have been described, but the invention can also be applied to a rotation connection unit taking an inversion-type double-winding structure housing a larger number of flat cables.

In the first to third embodiments, the rotation connection units each built in the steering system of an automobile have been described; however, in addition, the invention can also be applied to other rotation connection units used for electric connection between relatively rotating portions in household electrical appliances, of course.

Advantages of the Invention

As seen from the description made above, according to the invention, the length of the cable outer peripheral portion is provided with flexibility, whereby if the rotation connection unit is rotated at high speed, a phenomenon in which the cable outer peripheral portion sticks to the guide ring so as to fasten the guide ring 6 from the outer periphery does not occur, so that an increase in the rotation resistance of the guide ring can be prevented. Since shift from the setup value caused by cable length manufacturing tolerances can be absorbed, assembling the rotation connection unit is facilitated or smooth motion of the guide ring can be provided.

What is claimed is:

1. A rotation connection unit comprising:

an inner member;

an outer member; and a guide ring;

said inner member and said outer member being fitted for relative rotation in a state in which a cable housing space is formed between the inner member and the outer member, a plurality of conduction cables being housed in the cable housing space in a state in which a winding direction is inverted at an intermediate point and said cables move with relative rotation of both said inner and outer members, a plurality of inner terminal members and a plurality of outer terminal members, wherein the inner terminal members and the outer terminal members move relative to each other, and the inner terminal members and the outer terminal members are attached to respective ends of said cables, said guide ring for guiding moving of said cables being placed rotatably and is formed with a plurality of guide grooves through which inversion parts of said cables are passed at different positions, wherein said cables are housed in the cable housing space in a state in which a force in a direction touching an inner periphery of said outer member is given.

2. The rotation connection unit as claimed in claim 1, wherein one of said cables is formed longer than the length of the outer peripheral portion of said one of said cables which touches an outer periphery of said guide ring so that the force in the direction touching the inner periphery of said outer member is given.

3. The rotation connection unit as claimed in claim 1, further comprising:

terminal position adjustment means for attaching a terminal member attached to a terminal of one of said cables to either said outer member or said inner member so that a position of said terminal member is adjusted in a length direction of said one of said cables.

4. The rotation connection unit as claimed in claim 2, further comprising:

terminal position adjustment means for attaching a terminal member attached to a terminal of one of said cables to either said outer member or said inner member so that a position of said terminal member is adjusted in a length direction of said one of said cables.

5. The rotation connection unit as claimed in claim 3, wherein said terminal position adjustment means comprises;

a plurality of engaged parts formed in either said outer member or said inner member at predetermined pitches in the length direction of said one of said cables, and an engagement part which is formed on said terminal member and engages at least one of said engaged parts.

6. The rotation connection unit as claimed in claim 4, wherein said terminal position adjustment means comprises;

a plurality of engaged parts formed in either said outer member or said inner member at predetermined pitches in the length direction of one of said cables, and an engagement part which is formed on said terminal member and engages at least one of said engaged parts.

7. The rotation connection unit as claimed in claim 1, wherein said terminal member attached to the terminal of one of said cables is attached to either said outer member or said inner member in a state in which said terminal member can be moved in the length direction of said one of said cables and is elastically urged in a direction in which said one of said cables touches said outer member.

8. The rotation connection unit as claimed in claim 2, wherein said terminal member attached to the terminal of said one of said cables is attached to either said outer member or said inner member in a state in which said terminal member can be moved in the length direction of said one of said cables and is elastically urged in a direction in which said one of said cables touches said outer member.

9. The rotation connection unit as claimed in claim 7, wherein said cables are formed like springs in terminal proximity portions.

10. The rotation connection unit as claimed in claim 8, wherein said cables are formed like springs in terminal proximity portions.

* * * * *